United States Patent
Umebayashi et al.

(10) Patent No.: US 7,326,496 B2
(45) Date of Patent: Feb. 5, 2008

(54) ALKALI DRY CELL

(75) Inventors: Takayuki Umebayashi, Neyagawa (JP); Mitsuji Adachi, Suita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 531 days.

(21) Appl. No.: 10/487,342

(22) PCT Filed: Sep. 2, 2002

(86) PCT No.: PCT/JP02/08898

§ 371 (c)(1), (2), (4) Date: Feb. 20, 2004

(87) PCT Pub. No.: WO03/028129

PCT Pub. Date: Apr. 3, 2003

(65) Prior Publication Data

US 2004/0209167 A1    Oct. 21, 2004

(30) Foreign Application Priority Data

Sep. 25, 2001    (JP) ............................. 2001-291385

(51) Int. Cl.
    *H01M 4/50*    (2006.01)
(52) U.S. Cl. ................ 429/224; 429/231.8; 429/232; 429/231.5; 429/215; 429/205; 429/206; 205/57
(58) Field of Classification Search ............... 429/224, 429/231.8, 231.5, 206, 207, 232, 215, 205; 205/57
See application file for complete search history.

(56) References Cited

U.S. PATENT DOCUMENTS

| | | | |
|---|---|---|---|
| 5,733,674 A | 3/1998 | Law et al. | |
| 5,928,714 A * | 7/1999 | Nunome et al. | ............. 429/224 |
| 6,585,881 B2 * | 7/2003 | Davis et al. | .................. 205/57 |

FOREIGN PATENT DOCUMENTS

| | | | |
|---|---|---|---|
| DE | 3337568 A1 | | 4/1985 |
| DE | 19532073 | * | 3/1997 |
| EP | 0 789 410 A1 | | 8/1997 |
| EP | 0 863 561 A1 | | 9/1998 |
| JP | 63-126165 | * | 5/1988 |
| JP | 9-139201 | | 5/1997 |
| JP | 2001-297776 A | | 10/2001 |
| WO | WO 94/27332 | | 11/1994 |
| WO | WO 00/24071 | | 4/2000 |
| WO | WO 00/30198 | | 5/2000 |

OTHER PUBLICATIONS

Nunome, J., "Surface-Modified Manganese Dioxide For Alkaline-Manganese Battery", Materials Research Society Symposium Proceedings XP008078498, Apr. 1999, pp. 109-112, vol. 575, Materials Research Society, Pittsburgh, Pa USA.
European Search Report issued in European Patent Application No. EP 02 76 2972, mailed May 21, 2007.

* cited by examiner

*Primary Examiner*—Laura Weiner
(74) *Attorney, Agent, or Firm*—McDermott Will & Emery LLP

(57) ABSTRACT

In an alkaline dry battery comprising a positive electrode, a negative electrode, and an alkaline electrolyte, the positive electrode includes manganese dioxide and graphite powder and contains $Ti(SO_4)_2$ as an additive.

2 Claims, 1 Drawing Sheet

ALKALI DRY CELL

TECHNICAL FIELD

The present invention relates to an alkaline dry battery.

BACKGROUND ART

With advancement and development of cellular phones and other portable information devices, there has been high demand for alkaline dry batteries that are capable of discharging under a heavy load.

Some techniques proposed to attain the enhanced discharge characteristic of the alkaline dry battery under a heavy load add titanium oxide in anatase form (for example, JAPANESE EXAMINED PATENT PUBLICATION No. 8-510355), a complex oxide mainly composed of titanium oxide (for example, JAPANESE LAID-OPEN PATENT PUBLICATION No. 9-139201), or a barium compound like barium sulfate (for example, INTERNATIONAL PUBLICATION No. WO 00/30198) as an additive for the positive electrode.

Addition of titanium oxide, the complex oxide mainly composed of titanium oxide, or the barium compound to the positive electrode improves the discharge characteristic under a heavy load to some extent. Such addition, however, does not ensure the utilization rate of the active material sufficiently. These conventional additives require a large amount to be used for the sufficient effects. Addition of a large amount, however, undesirably lowers the amount of manganese dioxide as an active material filled in the positive electrode, thus decreasing the electric capacity of the battery and causing some deterioration of the discharge characteristic under a light load. The alkaline dry batteries are applied to devices that require discharge under a light load, such as clocks. Deterioration of the discharge characteristic under a light load is accordingly undesirable.

DISCLOSURE OF INVENTION

The present invention is directed to an alkaline dry battery including a positive electrode, a negative electrode, and an alkaline electrolyte. The positive electrode includes manganese dioxide and graphite powder and contains $Ti(SO_4)_2$ as an additive.

It is preferable that the amount of $Ti(SO_4)_2$ contained in the positive electrode is 0.1 to 5 parts by weight per 100 parts by weight of manganese dioxide.

BEST MODE FOR CARRYING OUT THE INVENTION

Figure 1:
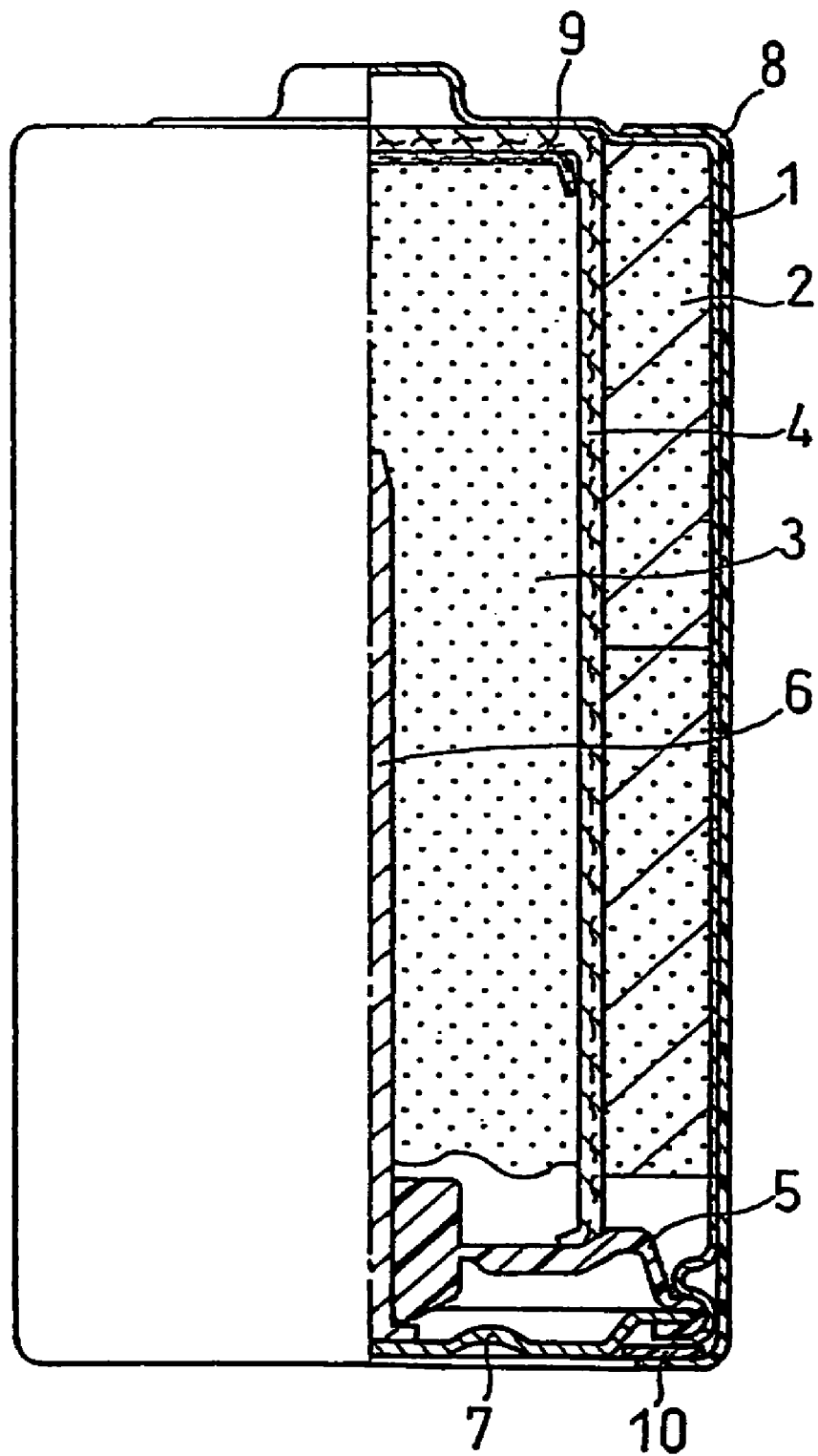
FIG. 1 is a partial vertical sectional view illustrating one example of an alkaline dry battery embodying the present invention.

The positive electrode of the alkaline dry battery of the present invention includes manganese dioxide as a positive electrode active material, graphite powder as a conductive material, and titanium sulfate ($Ti(SO_4)_2$) as an additive.

It is expected that addition of $Ti(SO_4)_2$ to the positive electrode has the effect of enhancing the utilization rate of the positive electrode active material in discharge under a heavy load and under an intermediate load. Addition of $Ti(SO_4)_2$ improves the formability of the positive electrode and increases the amount of the active material filled therein, thus being expected to suppress deterioration of the discharge. characteristic under a light load.

The utilization rate of the positive electrode active material is lowered in discharge under a heavy load and under an intermediate load. This may be ascribed to deformation of the crystal lattice of manganese dioxide in the course of discharge, which worsens the conductivity of the positive electrode. No effective measure has been proposed so far to suppress the deformation of the crystal lattice of manganese dioxide. It is accordingly difficult to sufficiently enhance the utilization rate of the active material.

The positive electrode of the alkaline dry battery of the present invention contains $Ti(SO_4)_2$, so that the sulfate ion is produced inside the positive electrode. It is expected that the sulfate ion goes into the space of the crystal lattice of manganese dioxide and thereby suppresses deformation of the crystal lattice during discharge. The crystal lattice can thus maintain its initial state even in the last stage of discharge. This ensures smooth movement and diffusion of protons, which are predominant in the reduction reaction of the positive electrode, and prevents deterioration of the conductivity of the positive electrode.

$Ti(SO_4)_2$ is water soluble. The aqueous solution of $Ti(SO_4)_2$ functions as a binding agent of the positive electrode material mixture including manganese dioxide and the conductive material. Namely $Ti(SO_4)_2$ is expected to have the effects of improving the formability of the positive electrode material mixture and enhancing the amount of the positive electrode filled in the battery.

A small amount of $Ti(SO_4)_2$ exerts the equivalent or better effects to or than those of the conventional additives. The use of $Ti(SO_4)_2$ is accordingly expected to have more effect of enhancing the amount of the active material filled in the positive electrode, that is, the effect of preventing deterioration of the discharge characteristic under a light load than that of conventional additives.

Even a small amount of $Ti(SO_4)_2$ exerts the equivalent or better effects to or than those of the conventional additives, since $Ti(SO_4)_2$ has a higher ionization degree and supplies a greater amount of the sulfate ion.

It is preferable that the positive electrode contains 0.1 to 5 parts by weight of $Ti(SO_4)_2$ per 100 parts by weight of manganese dioxide. The greater content of $Ti(SO_4)_2$ than 5 parts by weight tends to cause deterioration of the discharge characteristic under a light load. The smaller content than 0.1 part by weight, on the other hand, makes it difficult to sufficiently improve the discharge characteristic under a heavy load and/or under an intermediate load. The especially preferable amount of $Ti(SO_4)_2$ ranges from 1 to 3 parts by weight per 100 parts by weight of manganese dioxide.

The powdery form of $Ti(SO_4)_2$ causes troublesome management of the amount of addition in the manufacturing process, because of the high hygroscopic property of the powder. It is thus desirable to add $Ti(SO_4)_2$ in an aqueous solution form to the positive electrode material mixture.

It is preferable that an aqueous solution containing at least 1% by weight of $Ti(SO_4)_2$ is used for preparation of the positive electrode material mixture. The concentration of $Ti(SO_4)_2$ in the aqueous solution lower than 1% by weight undesirably increases the total amount of the aqueous solution used to obtain a desired amount of $Ti(SO_4)_2$ and thereby lowers the formability and workability of the positive electrode material mixture.

The positive electrode material mixture is prepared, for example, by mixing manganese dioxide with graphite powder at a predetermined ratio, adding an aqueous solution of $Ti(SO_4)_2$ to the mixture, and further blending. The resulting positive electrode material mixture is generally compressed and formed into flakes. The flakes of the positive electrode material mixture are then crushed into granules and are classified with a sieve. The particles of the positive electrode material mixture having the size of 10 to 100 meshes are molded into short cylindrical pellets.

The manganese dioxide and the graphite powder may be any of the conventionally used without any limitation. The negative electrode and the alkaline electrolyte may also be any of the conventionally used without any limitation.

The present invention is discussed concretely with reference to some examples, although the invention is not restricted to these examples in any sense.

EXAMPLES 1 TO 6 AND COMPARATIVE EXAMPLE 1

FIG. 1 is a partial vertical sectional view illustrating an alkaline dry battery manufactured in Examples of the present invention.

With referring to FIG. 1, two short cylindrical pellets of a positive electrode material mixture 2 are set in a battery case 1 in such a manner as to be in contact with the inner wall of the case 1. A gel negative electrode 3 is received in a hollow defined by the pellets of the positive electrode material mixture 2 via a bottomed cylindrical separator 4. The battery case 1 may be a steel case having inner surface plated with nickel. The bottom face of the separator 4 is reinforced with a bottom sheet 9. The bottom sheet 9 is composed of the same material as that of the separator 4.

This battery was manufactured according to the procedure discussed below.

(1) Preparation of Positive Electrode

Manganese dioxide and graphite powder were mixed at a weight ratio of 90 to 10. An aqueous solution of $Ti(SO_4)_2$, which was adjusted to a predetermined concentration, was added to the mixture and the resulting mixture was blended well. The amount of the aqueous solution was adjusted to have $Ti(SO_4)_2$ of each predetermined amount (x parts by weight) shown in Table 1 per 100 parts by weight of manganese dioxide.

Subsequently, 3 parts by weight of an alkaline electrolyte was added to 100 parts by weight of the resulting mixture. After sufficient stirring, the whole mixture was compressed and formed into flakes. The flakes of the positive electrode material mixture were crushed into granules and were classified with a sieve to particles of 10 to 100 meshes. The particles of the positive electrode material mixture were molded into short cylindrical pellets. Two pellets of the positive electrode material mixture 2 were set in the battery case 1 and were brought into close contact with the inner wall of the battery case 1 by means of a pressure jig.

The bottomed cylindrical separator 4 was then disposed in a hollow defined by the two pellets of the positive electrode material mixture 2 set in the battery case 1. A predetermined amount of the alkaline electrolyte was injected into the separator 4 to be absorbed by the separator 4 for a predetermined time period. The gel negative electrode 3 was subsequently charged into the separator 4, and a negative electrode collector 6 was inserted at the center of the gel negative electrode 3. The negative electrode collector 6 was integrated with a gasket 5 and a bottom plate 7 which also served as a negative electrode terminal.

The gel negative electrode 3 was prepared by mixing 33 parts by weight of the alkaline electrolyte, 1 part by weight of a gel-forming agent, and 66 parts by eight of zinc powder. Sodium polyacrylate was used for the gel-forming agent. The alkaline electrolyte was a 40% by weight aqueous solution of potassium hydroxide.

A non-woven fabric comprising polyvinyl alcohol fibers and rayon fibers was used for the separator 4 and the bottom sheet 9.

The opening end of the battery case 1 was caulked to the peripheral portion of the bottom plate 7 via the end of the gasket 5 for sealing the battery. An insulating ring 10 was set on the curved opening end of the battery case 1. The outer surface of the battery case 1 was covered with a jacket label 8. This completed each alkaline dry battery.

TABLE 1

| Example No. | X: Amount of $Ti(SO_4)_2$ (part by weight) | Duration of discharge | | |
|---|---|---|---|---|
| | | 2.2 Ω | 10 Ω | 39 Ω |
| Com. Ex. 1 | 0 | 100 | 100 | 100 |
| Ex. 1 | 0.05 | 101 | 100 | 100 |
| Ex. 2 | 0.1 | 105 | 103 | 100 |
| Ex. 3 | 1 | 112 | 109 | 100 |
| Ex. 4 | 3 | 113 | 109 | 100 |
| Ex. 5 | 5 | 113 | 108 | 99 |
| Ex. 6 | 6 | 112 | 108 | 97 |

Each of the resulting alkaline dry batteries was evaluated by the following test.

[Evaluation]

For evaluation of the discharge characteristic under a heavy load, each initial alkaline dry battery (immediately after manufacture) was continuously discharged under a load of 2.2 Ω to the end-of-discharge voltage of 0.9 V. The duration of discharge was measured. The result of an alkaline dry battery without $Ti(SO_4)_2$ (Comparative Example 1) was set equal to 100 as a reference value, and the discharge characteristic of each alkaline dry battery under a heavy load was expressed as an index. The results of the evaluation are shown in Table 1.

The discharge characteristic of each alkaline dry battery under an intermediate load was evaluated by a similar test to that for the discharge characteristic under a heavy load, except continuous discharge under a load of 10 Ω. The discharge characteristic of each alkaline dry battery under a light load was evaluated by a similar test to that for the discharge characteristic under a heavy load, except continuous discharge under a load of 39 Ω. These results of the evaluation are also shown in Table 1.

According to the results of Table 1, addition of $Ti(SO_4)_2$ to the positive electrode material mixture in the range of 0.1 to 5 parts by weight per 100 parts by weight of manganese dioxide gives the resulting alkaline dry battery the excellent discharge characteristic under a heavy load, while not causing deterioration of the discharge characteristic under a light load. The smaller amount of $Ti(SO_4)_2$ like Example 1 does not sufficiently enhance the utilization rate of the positive electrode active material and hardly improves the discharge characteristic under a heavy load. The greater amount of $Ti(SO_4)_2$ like Example 6, on the other hand, causes some deterioration of the discharge characteristic under a light load.

COMPARATIVE EXAMPLES 2 AND 3

Alkaline dry batteries similar to that of Example 3 were manufactured, except that $TiO_2$ (Comparative Example 2) or BaSO$_4$ (Comparative Example 3) was used instead of Ti(SO$_4$)$_2$. Namely Comparative Example 2 used 1 part by weight of TiO$_2$ per 100 parts by weight of manganese dioxide. Comparative Example 3 used 1 part by weight of BaSO$_4$ per 100 parts by weight of manganese dioxide.

The resulting alkaline dry batteries were subjected to the same evaluation test as that performed in above described Examples. The results of the evaluation are shown in Table 2.

TABLE 2

| Example No. | Additive | Duration of discharge | | |
|---|---|---|---|---|
| | | 2.2 Ω | 10 Ω | 39 Ω |
| Ex. 3 | Ti(SO$_4$)$_2$ | 112 | 109 | 100 |
| Com. Ex. 2 | TiO$_2$ | 107 | 105 | 98 |
| Com. Ex. 3 | BaSO$_4$ | 106 | 104 | 97 |

According to the results of Table 2, the battery containing Ti(SO$_4$)$_2$ has the more excellent discharge characteristic under a heavy load and under an intermediate load, compared with the batteries containing the identical amount of conventional additives. This is because Ti(SO$_4$)$_2$ supplies a greater amount of sulfate ions than that of barium sulfate and the greater amount of sulfate ions effectively suppresses deformation of the crystal lattice of manganese dioxide and prevents deterioration of the conductivity of the positive electrode. The battery containing Ti(SO$_4$)$_2$ does not have deterioration of the discharge characteristic under a light load. This may be ascribed to the improved formability of the positive electrode containing Ti(SO$_4$)$_2$, which leads to an increase in amount of the positive electrode filled in the battery.

IINDUSTRIAL APPLICABILITY

As described above, a preferred embodiment of the present invention provides an alkaline dry battery that ensures the excellent discharge characteristic under a heavy load and under an intermediate load and suppresses deterioration of the discharge characteristic under a light load.

The invention claimed is:

1. An alkaline dry battery comprising a positive electrode, a negative electrode, and an alkaline electrolyte,
   said positive electrode comprising manganese dioxide and graphite powder and containing Ti(SO$_4$)$_2$ as an additive, wherein the amount of said Ti(SO$_4$)$_2$ contained in said positive electrode is 0.1 to 5 parts by weight per 100 parts by weight of said manganese dioxide.

2. An alkaline dry battery in accordance with claim 1, wherein the amount of said Ti(SO$_4$)$_2$ contained in said positive electrode is 1 to 3 parts by weight per 100 parts by weight of said manganese dioxide.

* * * * *